United States Patent Office 2,707,883
Patented May 10, 1955

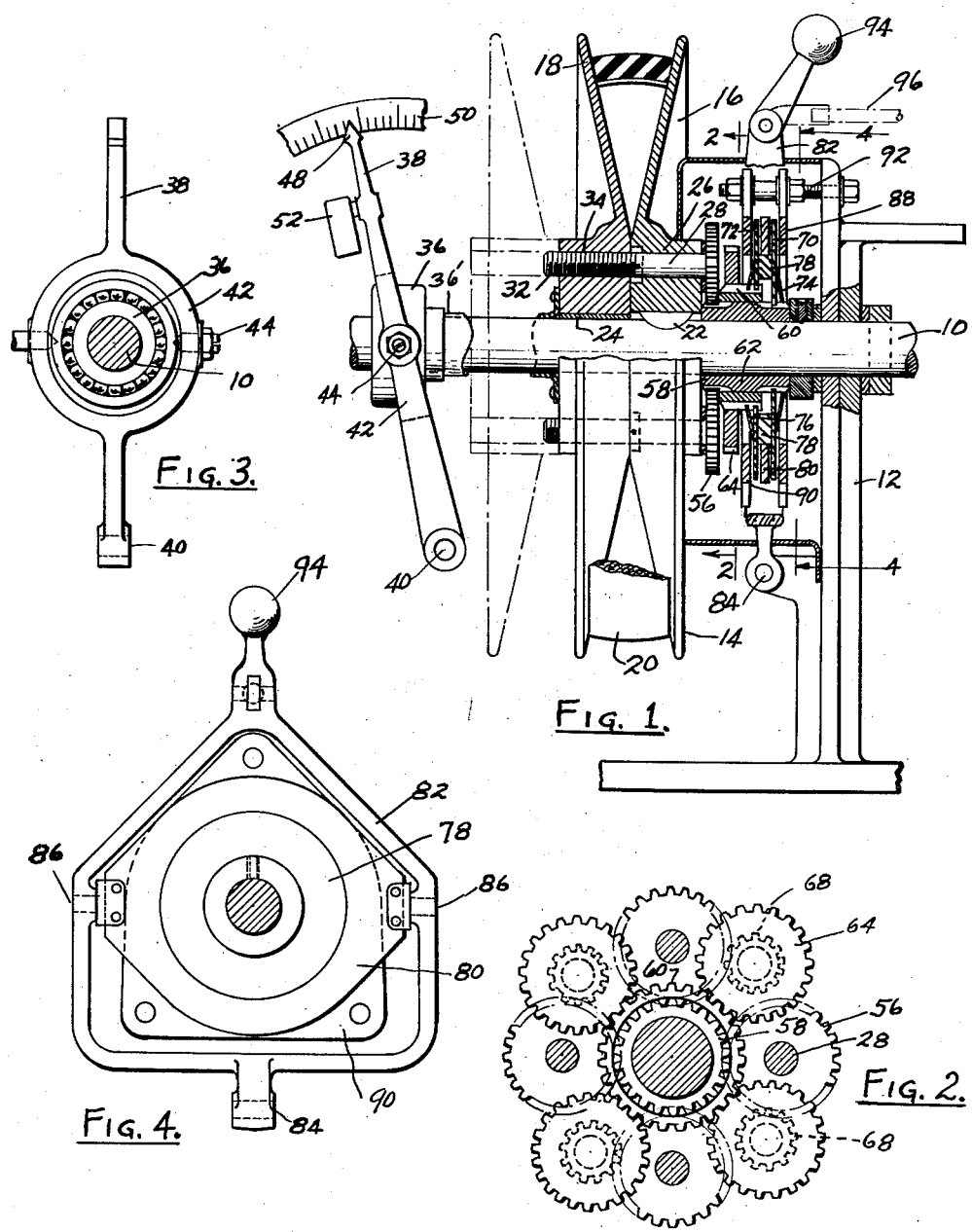

2,707,883

VARIABLE SHEAVE

Adiel Y. Dodge, Rockford, Ill.

Application November 8, 1954, Serial No. 467,495

7 Claims. (Cl. 74—230.17)

This invention relates to a power transmission means and more particularly to a power transmitting means employing V-belts and variable sheaves which may be varied over a range during operation thereof to provide a range of speed ratios.

While attempts have been made to provide power transmissions which include sheaves of variable effective diameter, that is the diameter at which a power transmitting element engages the sheave, such attempts have included means for varying the effective diameter of the sheave powered by means separate and apart from the power being transmitted. Such a dual power system is uneconomical, and also provides a potential source of failure separate from the original power transmission system.

It is therefore an object of this invention to provide a variable-sheave power transmission system which includes a planetary gear arrangement operatively associated with the variable-sheave and utilizing a portion of the power transmitted by said power transmission system for controlling the variable-sheave.

Still a further object of this invention is to provide a variable-sheave power transmission system having means adapted to remotely control the variable-sheave, and including safety means responsive to the condition of the variable-sheave for controlling said remote control of the variable-sheave.

Another object of this invention is to provide a novel power transmitting means including a sheave and an endless belt trained thereover and means for varying the effective diameter of the sheave at which the endless belt operatively engages the sheave, thereby varying the speed being transmitted.

A further object of this invention is to provide a pair of sheave members which define a V-grooved sheave of a power transmitting means in combination with novel means operatively associated with said V-grooved sheave for varying the width of the V-groove in the sheave while the sheave is operating to transmit power.

A further object of this invention is to provide a transmission having a sheave whose operating, or effective, diameter may be varied while the sheave is operating to transmit power including means utilizing a portion of the power being transmitted for selectively varying the effective diameter of the sheave.

A further object to this invention is to provide a variable V-belt sheave in which the respective members thereof are movably attached together in a manner which will reduce the fretting action inherent in variable-sheaves and will tolerate that fretting action which may not be eliminated.

Further objects and advantages of this invention will become apparent as the following description proceeds and the features of novelty which characterize this invention will be pointed out with particularity in the claims annexed to and forming part of this specification.

A preferred embodiment of the invention is shown in the accompanying drawings, in which:

Figure 1 is a side view, partly in cross-section, of a variable-sheave part of a power transmission provided with the novel means for control of the variable-sheave.

Fig. 2 is a view of the planetary gearing of the variable-sheave control means and is taken substantially on line 2—2 of Fig. 1.

Fig. 3 is a view taken looking from the left of Fig. 1; and

Fig. 4 is a view of the friction control for the variable-sheave and is taken on line 4—4 of Fig. 1.

Referring now to the figures, there is shown in Fig. 1 a shaft 10 which is rotatably mounted in frame means 12. Mounted on the shaft 10 is a sheave generally indicated at 14, and composed of sheave members 16 and 18. Trained over the sheave 14 is an endless flexible V-belt 20.

The sheave member 16 is keyed by means of key 22 to the shaft 10 and is stationary relative to the shaft. The sheave member 18 is slidably mounted on bearing 24 carried by shaft 10 for movement toward and away from sheave members 16. As shown in full lines in Fig. 1, the sheave members 16 and 18 are in one extreme position, that is the position where the sheave members are in abutting relation to provide the maximum effective pulley diameter. The dot-dash lines as shown in Fig. 1 show the other extreme position of the sheave member 18 that is, when sheave members 16 and 18 are spread furthest apart to provide the minimum effective pulley diameter.

The sheave member 16 has four bores 26 in the web thereof, the axes of which lie parallel to the axis of the shaft 10 and within which are journaled elongated bolts 28. The bolts 28 each have a smooth shank portion 30 which is rotatably journaled in bore 26, and a threaded portion 32 which is threaded into a threaded bore 34 in the sheave member 18. The bolts 28 provide an operative connection between the sheave members 16 and 18 causing said sheave members to rotate in unison. The threaded connection between the threaded bolt portions 32 and the threaded bores 34 also provides that when the bolts 28 are rotated about their axes, the sheave member 18 is caused to move relative to the bolts 28, either toward or away from the sheave member 16, according to the direction of rotation of the bolt members 28. The bearing 24 provides for the sliding movement of the sheave member 18 axially of the shaft 10.

Operatively associated with the sheave member 18 and axially movable therewith is a bearing 36. There is provided an indicator arm 38 mounted for pivoting about a pin 40, the axis of which is perpendicular of the axis of shaft 10 and is spaced therefrom. The arm 38 is operatively associated with bearing 36 by means of a ring 42 carried by arm 38 and surrounding bearing 36, which ring carries taper pins 44 that are positioned to ride in a socket in the outer periphery of the bearing 36, thereby providing an operative connection between the arm 38 and the bearing 36. The arm 38 carries a pointer 48 for indicating on the scale 50 the position of sheave 18 relative to sheave 16.

The bearing 36 is slidable on the shaft 10 and is connected to the sheave member 18 by a tube 36' around the shaft.

Shown in Fig. 1, in full lines, is the extreme position which arm 38 may attain when the sheave member 18 is in the extreme position spaced away from sheave member 16.

In Fig. 1, the arm 38 is shown operating a microswitch 52 which may be used to relay to a remote point the information that the sheave member 18 has reached its extreme position. This information relayed by switch 52 may be utilized either for signaling an operator or for controlling a remote control means which actuates the movement of the sheave member 18. Thus, microswitch 52 may serve either as a safety control for a remote control means or circuit which is operative to cause movement of sheave member 18, and may be used to prevent movement of sheave member 18 beyond its point of extreme movement, or may be used to prevent continued or overloaded operation of the means for moving sheave member 18 when further movement of sheave member 18 is undesirable, such as is the case when the sheave member 18 reaches the position shown by the dot-dash line. A similar switch (not shown) may be employed to shut off the control force, shifting rod 96 when sheave member 18 abuts member 16.

Referring now to the means for moving the sheave member 18 toward and away from the sheave member 16, each bolt 28 carries a first planetary gear 56 which is in mesh with a first sun gear 58. The sun gear 58 is rotatably mounted on the shaft 10. When the entire sheave 14 is rotating about the axis of the shaft 10, the bolts 28 are translating about the axis of shaft 10 and the sun gear 58 is thus caused to rotate about the axis of shaft 10 at the same angular velocity as sheave 14.

A second sun gear 60 is rotatably mounted on a bearing ring 62 formed integral with the first sun gear 58. This second sun gear 60 has four second planetary gears 64 meshing therewith. Each second planetary gear 64 is a compound gear having a reduced diameter gear portion 68 in mesh with one of said first planetary gears 56. A suitable framework or cage (not shown) may be provided for supporting the gears 64 and 68 and for insuring engagement of the second planetary gears with the second sun gears 60 and providing for engagement of the pinion gears 68 with the first planetary gears 56.

A first disc 70 is splined to the first sun gear 58 so as to be rotatable therewith, but so as to be axially slidable thereon. A second annular disc 72 is similarly splined to the second sun gear 60 so as to be rotatable therewith and is similarly axially slidable relative to the sun gear 60.

Spring means including a disc type spring 74, mounted on sun gear 58, engages the disc 70 and biases said disc 70 in the direction toward the second disc 72. A second spring means including a disc type spring 76 is similarly adapted to bias disc 72 in the direction toward disc 70.

There is an annular control ring 78 of smaller exterior diameter than disc 70 or 72 positioned between the discs 70 and 72 against which the discs 70 and 72 normally press under the bias of the springs 74 and 76. The friction between each disc 70 and 72 and the ring 78 is sufficient to maintain the discs 70 and 72 and ring 78 rotating as a unit so that there is no relative motion therebetween. Thus sun gears 58 and 60 are normally connected through the friction clutch formed by the discs 70 and 72 and the ring 78.

The ring 78 lies inside of and is carried by an annular disc 80 fitting between the outer edges of the discs 70 and 72 and thinner than the ring 78. The disc 80 is supported by a pivotally mounted yoke 82 as best seen in Fig. 4 which is mounted for pivotal movement about a pin 84 carried by the frame 12. The yoke straddles the clutch and brake mechanism and at its sides carries pins 86 which are connected to the edges of the disc 80 as seen in Fig. 4 to support the disc. The ring 78 fits rotatably within the disc 80 so that it can turn as described above with the discs 70 and 72 while the disc 80 remains stationary.

The disc 80 forms a part of two brake mechanisms adapted to hold the discs 70 and 72 selectively against rotation. The brake mechanisms are completed by fixed discs 88 and 90 lying at the outer sides of the discs 70 and 72 respectively. The discs 88 and 90 are supported by spaced bolts 92 on the frame 12 in fixed position relative to the frame.

To engage the brakes and to disengage the clutch mechanism the yoke 82 may be swung about its pivot through a manual handle 94 at its upper end or through remote control mechanism pivotally connected to the upper end of the yoke by a rod 96 as shown in dot-dash lines in Fig. 1. The yoke normally occupies the neutral or centered position shown in Fig. 1 in which the spring discs 74 and 76 hold the discs 70 and 72 out of engagement with the fixed discs 88 and 90 and in engagement with the ring 78. At this time, the sun gears 58 and 60 turn as a unit with the shaft and the pulley members so that the screws 28 are stationary and the diameter of the pulley remains constant.

To change the pulley diameter, the yoke 82 may be swung in one direction or the other to disengage the discs 70 and 72 from the ring 78 and to engage one of the discs between the ring 80 and either disc 88 or 90. For example, if the yoke is shifted to the left as seen in Fig. 2, the disc 72 will be gripped between the disc 80 and the disc 90 and will be held stationary to hold the sun gear 60 stationary. At this time, as the pulley and shaft continue to rotate, the pinions 64 will be turned as they roll around the stationary sun gear 60. The pinions 68 will turn the pinions 64 and due to their meshing engagement with the pinions 56 they will turn these pinions and the screws 28 as the pulley continues to rotate. Thus, the pulley member 18 will be shifted axially by these screws relative to the pulley member 16 to change the effective diameter of the pulley. When the yoke is released and returned to its central position the discs 70 and 72 will reengage the ring 78 so that the gearing will turn as a unit to hold the screws 28 against further rotation and thereby to hold the clutch in its adjusted position.

Conversely, shifting yoke 82 and thereby disc 80 to the right will retard and stop disc 70, thereby stopping the rotation of sun gear 58, thus directly causing gears 56 to roll around sun gear 58 in the direction opposite to that just described, thereby revolving screws 34 in the opposite direction, thus moving sheave member 18 axially in a direction opposite to that previously described.

Four screws 28 are employed in order to hold sheave member 18 in spaced relation to sheave 16 against the alternate forces and weaving action caused by the running belt. This construction employing four screws equally spaced and set at a relatively large radial position both eliminates the tendency for fretting action due to the alternating belt load and provides a structure which will stand up under any remaining fretting action far better than other arrangements such as splined arrangements at the center shaft.

Thus, by means of the present invention the diameter of the pulley can be varied easily and quickly during transmission of power thereby and without requiring any external power source to effect the adjustment. In fact, the effort required to control the adjustment by swinging the yoke 82 is relatively small and can produce a rapid and extremely accurate adjustment.

While one embodiment of the invention has been shown and described in detail, it will be understood that this is for the purpose of illustration only and is not to be taken as a definition of the scope of the invention, reference being had for this purpose to the appended claims.

What is claimed is:

1. A variable sheave comprising a shaft, a pair of conical pulley members mounted on the shaft for relative axial adjustment to vary the effective diameter of the pulley, rotatable elements connecting the members and adapted upon rotation to adjust the members relative to each other, a compound planetary gear set including pinions connected to the rotatable elements and a pair of gears, the pinions being caused to turn in opposite directions relative to the pulley members by rotation of the pulley members when the respective gears are held against rotation, clutch means normally connecting the gears for rotation as a unit with the pulley members, brake means to hold the gears selectively against rotation, and control means selectively to engage the brake means and simultaneously to disengage the clutch means.

2. A variable sheave comprising a shaft, a pair of conical pulley members mounted on the shaft for relative axial adjustment to vary the effective diameter of the pulley, rotatable elements connecting the members and adapted upon rotation to adjust the members relative to each other, a compound planetary gear set including pinions connected to the rotatable elements and a pair of gears, the pinions being caused to turn in opposite directions relative to the pulley members by rotation of the pulley members when the respective gears are held against rotation, a pair of clutch discs connected to the gears respectively, a ring between the clutch discs, springs normally urging the clutch discs into engagement with the ring to connect the gears for rotation as a unit with the clutch members, stationary brake elements adjacent the clutch discs, and an operating disc between the clutch discs shiftable axially to move the clutch discs selectively into engagement with the brake elements and out of engagement with the ring.

3. The construction of claim 2 in which the operating disc is annular and the ring is rotatably supported in the operating disc.

4. A variable sheave comprising a shaft, a pair of conical pulley members mounted on the shaft for relative axial adjustment to vary the effective diameter of the sheave, axially extending screws around the shaft connecting the pulley members to adjust them axially as the screws are turned, a compound planetary gear set including pinions connected to the screws and a pair of annular gears, the pinions being caused to turn in opposite directions by rotation of the pulley members in one direction when the respective gears are held against rotation, clutch means normally connecting the gears for rotation as a unit with the pulley members, brake means to hold the gears selectively against rotation, and control means selectively to engage the brake means and simultaneously to disengage the clutch means.

5. A variable sheave comprising a shaft, a pair of conical pulley members mounted on the shaft for relative axial adjustment to vary the effective diameter of the sheave, axially extending screws around the shaft connecting the pulley members to adjust them axially as the screws are turned, pinions carried by the screws, a pair of annular gears rotatable around the shaft one of which meshes with the pinions, compound pinions meshing with the other gear and with the first named pinions, clutch means normally connecting the annular gears for rotation as a unit with the pulley members, brake means selectively to hold the gears against rotation, and control means selectively to engage the brake means and simultaneously to disengage the clutch means.

6. A variable sheave comprising a shaft, a pair of conical pulley members mounted on the shaft for relative axial adjustment to vary the effective diameter of the sheave, axially extending screws around the shaft connecting the pulley members to adjust them axially as the screws are turned, pinions carried by the screws, a pair of annular gears rotatable around the shaft one of which meshes with the pinions, compound pinions meshing with the other gear and with the first named pinions, friction discs connected to the pinions respectively, a ring between the discs, springs, urging the discs, into engagement with the ring to connect the gears for rotation as a unit with the pulley members, fixed brake discs lying at the outer sides of the friction discs, an annular control disc lying between the friction discs, and means to shift the control disc axially to press the friction discs selectively into engagement with the brake discs and to move the friction discs out of engagement with the ring.

7. The construction of claim 6 in which the ring is rotatably mounted in the control disc.

References Cited in the file of this patent

UNITED STATES PATENTS

| 2,495,078 | Schweickart | Jan. 17, 1950 |

FOREIGN PATENTS

| 1,148 | Great Britain | of 1908 |
| 188,920 | Germany | Sept. 30, 1907 |